United States Patent
Tanaka et al.

(10) Patent No.: US 9,714,329 B2
(45) Date of Patent: Jul. 25, 2017

(54) VINYL CHLORIDE-BASED FILM FOR FOOD PACKAGING

(71) Applicant: MITSUBISHI CHEMICAL CORPORATION, Tokyo (JP)

(72) Inventors: Kazuya Tanaka, Nagahama (JP); Atsushi Fujita, Nagahama (JP); Yasuharu Amakasu, Nagahama (JP)

(73) Assignee: MITSUBISHI CHEMICAL CORPORATION, Tokyo (JP)

(*) Notice: Subject to any disclaimer, the term of this patent is extended or adjusted under 35 U.S.C. 154(b) by 0 days.

(21) Appl. No.: 14/895,818

(22) PCT Filed: May 27, 2014

(86) PCT No.: PCT/JP2014/063942
§ 371 (c)(1),
(2) Date: Dec. 3, 2015

(87) PCT Pub. No.: WO2014/199819
PCT Pub. Date: Dec. 18, 2014

(65) Prior Publication Data
US 2016/0108195 A1 Apr. 21, 2016

(30) Foreign Application Priority Data
Jun. 12, 2013 (JP) .................... 2013-123657

(51) Int. Cl.
| | |
|---|---|
| *C08K 5/15* | (2006.01) |
| *C08K 5/1515* | (2006.01) |
| *C08L 67/02* | (2006.01) |
| *C08J 5/18* | (2006.01) |
| *C08L 27/06* | (2006.01) |
| *C08L 63/00* | (2006.01) |
| *B65D 65/38* | (2006.01) |
| *C08K 5/11* | (2006.01) |

(52) U.S. Cl.
CPC ............ *C08J 5/18* (2013.01); *B65D 65/38* (2013.01); *C08K 5/1515* (2013.01); *C08L 27/06* (2013.01); *C08L 63/00* (2013.01); *C08J 2327/06* (2013.01); *C08J 2467/02* (2013.01); *C08K 5/11* (2013.01)

(58) Field of Classification Search
None
See application file for complete search history.

(56) References Cited

U.S. PATENT DOCUMENTS

2003/0114564 A1* 6/2003 Lang .................. C08G 63/20
524/315
2004/0198909 A1* 10/2004 Breitscheidel .... B32B 17/10761
525/165

FOREIGN PATENT DOCUMENTS

| | | |
|---|---|---|
| GB | 1173323 | 12/1969 |
| JP | 64-24843 | 1/1989 |
| JP | 2-269145 | 11/1990 |
| JP | 8-27341 | 1/1996 |
| JP | 9-176424 | 7/1997 |
| JP | 10-158453 | 6/1998 |
| JP | 2002-293957 | 10/2002 |
| JP | 2006-104242 | 4/2006 |
| JP | 2007-191610 | 8/2007 |
| JP | 2011-153210 | 8/2011 |
| WO | WO 2006/059606 | 6/2006 |
| WO | WO 2011/021400 | * 2/2011 |
| WO | WO 2013/084707 | 6/2013 |

OTHER PUBLICATIONS

Machine translation of WO 2011/021400, Feb. 24, 2011, Sano et al. p. 1-8.*
International Search Report issued in Int. App. No. PCT/JP2014/063942 dated Aug. 26, 2014.
International Preliminary Report on Patentability issued in PCT/JP2014/063942 dated Dec. 15, 2015.
Extended European Search Resort issued in App. No. 14811604.9 dated Sep. 29, 2016.

* cited by examiner

*Primary Examiner* — Susannah Chung
*Assistant Examiner* — Robert T Butcher
(74) *Attorney, Agent, or Firm* — Nixon & Vanderhye P.C.

(57) ABSTRACT

A film includes a vinyl chloride-based resin, a modified epoxidized vegetable oil having a multimer mass content of 5 to 50 %, an aliphatic dibasic acid ester-based compound with not more than 10 carbon atoms having a molecular weight-average of 200 to 1000, and a polyester-based compound having a molecular weight-average of 3000 to 10000, in which a mixture of the modified epoxidized vegetable oil and the aliphatic dibasic acid ester-based compound is compounded in a mass ratio of 30 to 50 parts based on 100 parts of the vinyl chloride-based resin, a content of the modified epoxidized vegetable oil in the mixture of the modified epoxidized vegetable oil and the aliphatic dibasic acid ester-based compound is 30 to 70 % by mass, and the polyester-based compound is compounded in a mass ratio of 5 to 15 parts based on 100 parts of the vinyl chloride-based resin.

4 Claims, No Drawings

VINYL CHLORIDE-BASED FILM FOR FOOD PACKAGING

This application is the U.S. national phase of International Application No. PCT/JP2014/063942 filed 27 May. 2014, which designated the U.S. and claims priority to JP Patent Application No. 2013-123657 filed Jun. 2013, the entire contents of each of which are hereby incorporated by reference.

TECHNICAL FIELD

The present invention relates to a film that is excellent in low-elution property (safety), packaging suitability (flexibility) and appearance.

BACKGROUND ART

In food packaging, in particular, in packaging of perishable foodstuffs such as meat, fresh fishes, and fruit and vegetables, there have been extensively used stretch films that are excellent in transparency, flexibility and heat sealability. As the film of this type, there have been generally used those films produced from a polyvinyl chloride-based resin composition prepared by compounding an adipic acid ester-based plasticizer and various anti-fogging agents in a polyvinyl chloride-based resin.

With respect to the films for food packaging, importance is attached to hygiene of compounding agents and migration thereof into food, etc. Therefore, these films have been regulated by FDA Standard (Food and Drug Administration) in Unites States, and by PL Standard (Voluntary Restraint Standard relating to Vinyl Chloride Resin Packaging Containers and the like), and resins, additives, etc., which are capable of conforming with these Standards have been used in a film for food packaging. In addition, as the testing method for confirming migration of additives into food, etc., such an extraction testing method defined as an evaporating residue testing method according to the Ministry of Health and Welfare Notice No. 20 has been conducted.

In the aforementioned background, with respect to a film for food packaging which is produced mainly from polyvinyl chloride, or a resin composition used for preparing the film, for example, in Patent Literature 1, there is described a vinyl chloride-based resin composition for food packaging which comprises a polyvinyl chloride-based resin, and an aliphatic polybasic acid-based polyester plasticizer and a glyceryl ester as an edible plasticizer which are used in the above resin.

In Patent Literature 2, there is described a food packaging material comprising 100 parts by mass of a chlorine-containing resin such as a polyvinyl chloride-based resin and 1 to 50 parts by mass of an epoxidized soybean oil produced by a hydrogen peroxide method which has a peroxide value of not more than 13 and comprises no specific phosphorus-based antioxidant.

In Patent Literature 3, there is described a stretch film comprising 100 parts by mass of a polyvinyl chloride-based resin, 15 to 45 parts by mass of a specific adipic acid ester-based plasticizer, 1 to 30 parts by mass of an epoxidized vegetable oil, 11 to 40 parts by mass of a polyester-based plasticizer having an average molecular weight of 1000 to 3000, and 0.1 to 1.0 part by mass of a higher fatty acid having 8 to 22 carbon atoms.

In Patent Literature 4, there is described a polyvinyl chloride-based resin composition comprising 100 parts by mass of a polyvinyl chloride-based resin, 17 to 21 parts by mass of a mixture of an aliphatic polybasic acid-based polyester-based plasticizer having a weight-average molecular weight of 800 to 3,000 and an aliphatic polybasic acid-based ester-based plasticizer (in which the content of the aliphatic polybasic acid-based polyester-based plasticizer is 20 to 40% by mass), 3 to 9 parts by mass of an epoxidized vegetable oil, and 0.5 to 3.0 parts by mass of a glycerol ester compound as an antifogging agent.

As described above, the plasticizer is conventionally added to the food packaging films comprising polyvinyl chloride as a main component to enhance the flexibility thereof. Among these food packaging films, in particular, wrap films for food packaging are required to have a high flexibility. For this reason, even though the plasticizer is added in such an amount as described in Patent Literature 4, the resulting films tend to have an insufficient flexibility. On the other hand, if the amount of the plasticizer added is increased, the amount of the plasticizer eluted from the films tends to be increased. Thus, it may be difficult to satisfy both a good flexibility of the obtained films and a less elution of the plasticizer from the films at the same time.

Also, in the technology described in Patent Literature 3, since the polyester-based plasticizer having an average molecular weight of 1000 to 3000 is a relatively readily elutable plasticizer, it may be difficult to ensure a practically sufficient anti-elution property (safety) of the resulting films.

In addition, in the technology described in Patent Literature 1, the use of the aliphatic polybasic acid-based polyestyer plasticizer solely tends to fail to exhibit a sufficient plasticizing effect, and if the amount of the glycerol ester added is increased, the amount of the plasticizer eluted from the films tends to be increased, so that it may be difficult to satisfy both of a good flexibility of the films and a low elution of the plasticizer from the films. Also, although the epoxidized soybean oil or the like as described in Patent Literature 2 which is a plasticizer derived from natural substances are suitably used for food packaging, the plasticizer of this type not only tends to be readily eluted from the films, but also tends to suffer from deterioration in appearance of the obtained films upon storage.

In the case where the film to which a large amount of the epoxidized soybean oil is added, is stored at a low temperature, the surface of the film tends to be whitened owing to solidification of the soybean oil bled out thereon, which results in poor appearance of the film. On the other hand, in the case where the film to which a large amount of the epoxidized soybean oil is added, is stored under the high-temperature and high-humidity condition, the epoxidized soybean oil bled out on the surface of the film tends to be reacted with water and polymerized, so that the surface of the film tends to be whitened, which also results in poor appearance of the film. Thus, in the technology described in Patent Literature 2, it may be difficult not only to satisfy both a good flexibility of the film and a low elution of the plasticizer therefrom, but also to provide a food packaging film having an excellent appearance.

Consequently, the food packaging film has been frequently required to have not only a good low-elution property (safety) and a good packaging suitability (flexibility), but also a good appearance. However, the conventional films have failed to satisfy all of good low-elution property, packaging suitability and appearance, and therefore there is a strong demand for films that are improved in their properties.

CITATION LIST

Patent Literature

Patent Literature 1: Japanese Patent Application Laid-Open (KOKAI) No. 2-269145
Patent Literature 2: Japanese Patent Application Laid-Open (KOKAI) No. 8-27341
Patent Literature 3: Japanese Patent Application Laid-Open (KOKAI) No. 9-176424
Patent Literature 4: Japanese Patent Application Laid-Open (KOKAI) No. 2011-153210

SUMMARY OF INVENTION

Technical Problem

The present invention has been accomplished in view of the above problems of the conventional art. An object of the present invention is to provide a vinyl chloride-based food packaging film having all of a good low-elution property (safety), a good packaging suitability (flexibility) and a good appearance.

Solution to Problem

As a result of the present inventors' earnest study in view of the above problems, it has been found that the above problems can be readily solved by a film having a specific structure. The present invention has been attained on the basis of this finding.

That is, in an aspect of the present invention, there is provided a film for food packaging, comprising a vinyl chloride-based resin (A), a modified epoxidized vegetable oil (B) having a multimer content of 5 to 50% by mass, an aliphatic dibasic acid ester-based compound (C) with not more than 10 carbon atoms having a weight-average molecular weight of 200 to 1000, and a polyester-based compound (D) having a weight-average molecular weight of 3000 to 10000, a mixture of the modified epoxidized vegetable oil (B) and the aliphatic dibasic acid ester-based compound (C) being compounded in an amount of 30 to 50 parts by mass based on 100 parts by mass of the vinyl chloride-based resin (A), a content of the modified epoxidized vegetable oil (B) in the mixture of the modified epoxidized vegetable oil (B) and the aliphatic dibasic acid ester-based compound (C) being 30 to 70% by mass, and the polyester-based compound (D) being compounded in an amount of 5 to 15 parts by mass based on 100 parts by mass of the vinyl chloride-based resin (A).

Advantageous Effects of Invention

In the vinyl chloride-based film for food packaging according to the present invention, by using the modified epoxidized vegetable oil (B) as a plasticizer, it is possible to reduce an elution amount of the plasticizer against isooctane as measured by evaporation residue testing method (one-side method) as prescribed in The Ministry of Health & Welfare Notice No. 20 (1982) to a very small level. Further, by mixing the aliphatic dibasic acid ester compound (C) with not more than 10 carbon atoms which is not only excellent in safety but also has a weight-average molecular weight of 200 to 1000, with the modified epoxidized vegetable oil (B) at specific ratios, the modified epoxidized vegetable oil (B) bled out on the surface of the film can be dissolved in the aliphatic dibasic acid ester compound (C) with not more than 10 carbon atoms, so that it is possible to produce a film for food packaging which is free from occurrence of a whitened film surface even when stored under the low-temperature condition or under the high-temperature and high-humidity condition, and excellent in appearance. As a result, the resulting film can be extensively used as a wrap film for food packaging.

DESCRIPTION OF EMBODIMENTS

In the following, the film for food packaging as an example of the preferred embodiment of the present invention is explained. However, it should be noted that the following embodiment is only illustrative and not intended to limit the present invention thereto.

The vinyl chloride-based resin (A) used in the present invention has an optional average polymerization degree. The average polymerization degree of the vinyl chloride-based resin (A) is preferably 800 to 1400. When the average polymerization degree of the vinyl chloride-based resin (A) is not less than 800, it is possible to impart a sufficient mechanical strength to the resulting film. On the other hand, when the average polymerization degree of the vinyl chloride-based resin (A) is not more than 1400, the resulting film is free from coloration owing to decomposition of the resin without generation of heat with increase in melt viscosity thereof.

Therefore, from these standpoints, among the above-mentioned range, in particular, the average polymerization degree of the vinyl chloride-based resin (A) is more preferably not less than 900 and not more than 1350, and even more preferably not less than 1000 and not more than 1300.

Examples of the vinyl chloride-based resin (A) include a homopolymer of vinyl chloride (hereinafter referred to as a "vinyl chloride-based homopolymer"), a copolymer of vinyl chloride and a monomer copolymerizable with vinyl chloride (hereinafter referred to as a "vinyl chloride-based copolymer"), a graft copolymer obtained by graft-copolymerizing vinyl chloride to a polymer other than the vinyl chloride-based copolymer (hereinafter referred to as a "vinyl chloride-based graft copolymer"), etc.

The vinyl chloride-based copolymer tends to be deteriorated in mechanical properties when the content of constitutional units other than vinyl chloride in the copolymer is increased. Therefore, the content of vinyl chloride in the vinyl chloride-based copolymer is preferably 60 to 99% by mass.

Meanwhile, the vinyl chloride-based homopolymer and the vinyl chloride-based copolymer may be produced by optional polymerization methods such as, for example, an emulsion polymerization method, a suspension polymerization method, a solution polymerization method, a bulk polymerization method, etc.

The monomer copolymerizable with vinyl chloride as used herein may be a monomer having a reactive double bond in a molecule thereof. Examples of the monomer copolymerizable with vinyl chloride include α-olefins such as ethylene, propylene and butylene; vinyl esters such as vinyl acetate and vinyl propionate; vinyl ethers such as butyl vinyl ether and cetyl vinyl ether; unsaturated carboxylic acids such as acrylic acid and methacrylic acid; acrylic acid or methacrylic acid esters such as methyl acrylate, ethyl methacrylate and phenyl methacrylate; aromatic vinyl compounds such as styrene and α-methyl styrene; halogenated vinyl compounds such as vinylidene chloride and vinyl fluoride; and N-substituted maleimides such as N-phenyl maleimide and N-cyclohexyl maleimide. These monomers may be used alone or in combination of any two or more thereof.

The polymer other than the vinyl chloride-based copolymer may be a polymer to which vinyl chloride can be grafted. Examples of the polymer other than the vinyl chloride-based copolymer include an ethylene-vinyl acetate copolymer, an ethylene-vinyl acetate-carbon monoxide copolymer, an ethylene-ethyl acrylate copolymer, an ethylene-ethyl acrylate-carbon monoxide copolymer, an ethylene-methyl methacrylate copolymer, an ethylene-propylene copolymer, an acrylonitrile-butadiene copolymer, polyurethane, chlorinated polyethylene, chlorinated polypropylene, etc. These polymers may be used alone or in combination of any two or more thereof.

The modified epoxidized vegetable oil (B) used in the present invention is an oil formed by multimerizing a part of an epoxidized vegetable oil. For example, as the modified epoxidized vegetable oil, there may be mentioned a reaction product of an epoxidized vegetable oil with a carboxylic acid, a product obtained by multimerizing an epoxidized vegetable oil having a peroxide value of 13.1 to 18.0 milli equivalent (mEq)/kg upon melting and kneading, etc. Examples of the epoxidized vegetable oil include an epoxidized soybean oil, an epoxidized linseed oil, an epoxidized cottonseed oil, an epoxidized peanut oil, an epoxidized safflower oil, an epoxidized grape seed oil, an epoxidized olive oil, etc. These modified epoxidized vegetable oils may be used alone or in the form of a mixture of any two or more thereof. Of these modified epoxidized vegetable oils, in view of a good compatibility with the vinyl chloride-based resin, an epoxidized soybean oil and an epoxidized linseed oil are particularly preferably used.

It is required that the content of multimers of the epoxidized vegetable oil in the modified epoxidized vegetable oil (B) is 5 to 50% by mass (in this case, the content of monomers of the epoxidized vegetable oil in the modified epoxidized vegetable oil (B) is 95 to 50% by mass). When the content of multimers of the epoxidized vegetable oil in the modified epoxidized vegetable oil (B) is 5 to 50% by mass, it is possible to satisfy both of plasticization and low elution property of the vinyl chloride-based resin. Specifically, when the content of multimers of the epoxidized vegetable oil in the modified epoxidized vegetable oil (B) is not more than 50% by mass, the vinyl chloride-based resin can be fully plasticized and can exhibit an excellent flexibility. On the other hand, when the content of multimers of the epoxidized vegetable oil in the modified epoxidized vegetable oil (B) is not less than 5% by mass, it is possible to fully suppress elution of the modified epoxidized vegetable oil (B) added as a plasticizer. Meanwhile, the multimer means a dimer or higher polymer.

From the above standpoint, among the above-specified range, the content of multimers of the epoxidized vegetable oil in the modified epoxidized vegetable oil (B) is preferably not less than 9% by mass (in this case, the content of monomers of the epoxidized vegetable oil in the modified epoxidized vegetable oil (B) is not more than 91% by mass) or not more than 40% by mass (in this case, the content of monomers of the epoxidized vegetable oil in the modified epoxidized vegetable oil (B) is not less than 60% by mass); more preferably not less than 10% by mass (in this case, the content of monomers of the epoxidized vegetable oil in the modified epoxidized vegetable oil (B) is not more than 90% by mass) or not more than 35% by mass (in this case, the content of monomers of the epoxidized vegetable oil in the modified epoxidized vegetable oil (B) is not less than 65% by mass); and even more preferably not less than 11% by mass (in this case, the content of monomers of the epoxidized vegetable oil in the modified epoxidized vegetable oil (B) is not more than 89% by mass) or not more than 30% by mass (in this case, the content of monomers of the epoxidized vegetable oil in the modified epoxidized vegetable oil (B) is not less than 70% by mass).

Meanwhile, the content of the multimers of the epoxidized vegetable oil in the modified epoxidized vegetable oil (B) may be measured by the following method. That is, the measurement is conducted by gel permeation chromatography (column: "TSKgel G2000HXL" (tradename) manufactured by Tosoh Corporation) using THF (solution concentration: 2.5 mg/mL; amount of solution injected: 0.05 mL; flow rate: 1 mL/min; temperature: 40° C.) as a solvent. From the obtained chart, the content of the monomers of the epoxidized vegetable oil in the modified epoxidized vegetable oil (B) is calculated, and the multimer content thereof is determined from the monomer content according to the following formula.

Multimer Content (% by mass)=100 (% by mass)−[monomer content (% by mass)]

Meanwhile, the multimer content of the epoxidized vegetable oil may be measured in any stage of the epoxidized vegetable oil it self, a reaction product of the epoxidized vegetable oil with a carboxylic acid, a mixture prepared by melting and kneading the vinyl chloride-based resin (A) and the below-mentioned components (B), (C) and (D) and additives, and a molded film product.

As the method of controlling the content of the multimers of the epoxidized vegetable oil in the modified epoxidized vegetable oil (B) to the range of 9 to 40% by mass, there may be adopted a method of reacting the epoxidized vegetable oil with a carboxylic acid to multimerize a part of the epoxidized vegetable oil, a method of multimerizing the epoxidized vegetable oil having a peroxide value of 13.1 to 18.0 milli equivalent (mEq)/kg upon melting and kneading, etc.

As the method of reacting the epoxidized vegetable oil with the carboxylic acid, there may be used any of a method of heating a mixture prepared by previously mixing the epoxidized vegetable oil with the carboxylic acid, for example, at a temperature of 100 to 220° C. for about 10 min to about 2 hr to multimerize the epoxidized vegetable oil, a method of mixing all of the vinyl chloride-based resin (A), the polyester-based compound (C), the epoxidized vegetable oil, the carboxylic acid and other additives, and then reacting the resulting mixture using a kneader such as a mixer and an extruder to multimerize the epoxidized vegetable oil, etc.

The carboxylic acid is not particularly limited as long as it can be reacted with the epoxidized vegetable oil such as, for example, an epoxidized soybean oil to multimerize the epoxidized vegetable oil, and preferably to control the content of multimers of the epoxidized vegetable oil in the modified epoxidized vegetable oil (B) to the above range of 5 to 40% by mass. Examples of the carboxylic acid include saturated carboxylic acids such as formic acid, acetic acid, propionic acid, butyric acid, valeric acid, caproic acid, enanthic acid, caprylic acid, pelargonic acid, capric acid, lauric acid, myristic acid, palmitic acid, margaric acid and stearic acid; unsaturated carboxylic acids such as oleic acid, linoleic acid, linolenic acid, sorbic acid, arachidonic acid, docosahexaenoic acid and eicosapentaenoic acid; hydroxy acids such as lactic acid, malic acid and citric acid; aromatic carboxylic acids such as benzoic acid, phthalic acid, isophthalic acid, terephthalic acid and salicylic acid; dicarboxylic acids such as oxalic acid, malonic acid, succinic acid, glutaric acid, adipic acid, fumaric acid and maleic acid; and other carboxylic acids such as oxocarboxylic acids and carboxylic acid derivatives such as aconitic acid, amino acid and nitrocarboxylic acid. These carboxylic acids may be used alone or in the form of a mixture of any two or more thereof. Of these carboxylic acids, from the standpoint of a high reactivity with the epoxidized vegetable oil, unsaturated carboxylic acids or dicarboxylic acids are preferably used.

The amount of the carboxylic acid added is preferably not less than 0.01 part by mass and not more than 8 parts by mass, more preferably not less than 0.05 part by mass and not more than 6 parts by mass, and even more preferably not less than 0.1 part by mass and not more than 3 parts by mass, based on 100 parts by mass of the epoxidized vegetable oil. When adding the carboxylic acid in such an amount as described above to the epoxidized vegetable oil, it is possible to impart good thermal stability and flexibility to the vinyl chloride-based resin, and obtain the modified epoxidized vegetable oil having an excellent low-elution property.

On the other hand, in the case where the epoxidized vegetable oil having a peroxide value of 13.1 to 18.0 milli equivalent (mEq)/kg is multimerized upon melting and kneading, the peroxide value of the epoxidized vegetable oil is preferably 13.3 to 17.5 mEq/kg, and more preferably 13.5 to 17.0 mEq/kg. When the peroxide value of the epoxidized vegetable oil is less than the above-specified range, it may be difficult to fully multimerize the epoxidized vegetable oil upon melting and kneading with the polyvinyl chloride-based resin (A), because of a less amount of a peroxy group in the epoxidized vegetable oil. On the other hand, when the peroxide value of the epoxidized vegetable oil is more than the above-specified range, strong malodor tends to be generated, for example, when the resulting composition is molded into a film, so that the composition tends to be hardly used as a food packaging material.

Meanwhile, according to the acetic acid/isooctane method described in the Standard Methods for the Analysis of Fats, Oils and Relates Materials (2.5.2 Peroxide Value; Standard Testing Methods for the Analysis of Fats, Oils and Relates Materials (I); prescribed by Japan Oil Chemists' Society; 2003 edition), the peroxide value of the epoxidized vegetable oil is determined from a milli equivalent (mEq/kg) of iodine per 1 kg of the epoxidized vegetable oil isolated when adding potassium iodide to the epoxidized vegetable oil.

In the present invention, by compounding the aliphatic dibasic acid ester-based compound (C) with not more than 10 carbon atoms having a weight-average molecular weight of 200 to 1000, the modified epoxidized vegetable oil (B) bled out on the surface of the resulting film can be dissolved in the aliphatic dibasic acid ester-based compound (C). As a result, it is possible to suppress coagulation of the epoxidized vegetable oil when the film is stored under the low-temperature condition as well as occurrence of the reaction thereof with water when the film is stored under the high-temperature and high-humidity condition, and provide a food packaging film having an excellent appearance.

When the weight-average molecular weight of the aliphatic dibasic acid ester-based compound (C) is not less than 200, it is possible to prevent bleeding out of an excessive amount of the aliphatic dibasic acid ester-based compound (C), which is desirable in view of safety. On the other hand, when the weight-average molecular weight of the aliphatic dibasic acid ester-based compound (C) is not more than 1000, the modified epoxidized vegetable oil (B) bled out on the surface of the resulting film can be dissolved therein, so that a film having an excellent appearance can be desirably obtained. From these standpoints, the weight-average molecular weight of the aliphatic dibasic acid ester-based compound (C) is preferably 300 to 800, and more preferably 350 to 600.

Specific examples of the aliphatic dibasic acid ester-based compound (C) include dimethyl adipate (DMA), dibutyl adipate (DBA), diisobutyl adipate (DIBA), di-2-ethylhexyl adipate (DOA), diisononyl adipate (DINA), diisodecyl adipate (DIDA), di-2-ethylhexyl azelate (DOZ), dimethyl sebacate (DMS), dibutyl sebacate (DBS), di-2-ethylhexyl sebacate (DOS), etc.

The polyester-based compound (D) used in the present invention has a weight-average molecular weight of 300 to 10000. When the weight-average molecular weight of the polyester-based compound (D) is not less than 3000, it is possible to suppress elution of the polyester-based compound (D), which is desirable in view of safety. On the other hand, when the weight-average molecular weight of the polyester-based compound (D) is not more than 10000, the polyester-based compound has a good compatibility with the vinyl chloride-based resin, so that it is possible to prevent elution of the polyester-based compound, and attain a sufficient plasticizing effect thereof.

From these standpoints, the weight-average molecular weight of the polyester-based compound (D) is preferably in the range of 4000 to 9000, and more preferably 5000 to 8000.

Specific examples of the polyester-based compound (D) include an adipic acid ester-based compound, a sebacic acid ester-based compound, a succinic acid ester-based compound and a polyester polyol. Of these compounds, from the standpoint of a good compatibility with the vinyl chloride-based resin, preferred are an adipic acid ester-based compound, a polyester polyol and a mixture thereof.

As the adipic acid ester-based compound, there may be mentioned, for example, a reaction product of adipic acid with a divalent alcohol. The divalent alcohol is not particularly limited, and examples of the divalent alcohol include ethylene glycol, propylene glycol, 1,3-butanediol, 1,4-butanediol, 1,6-hexanediol, etc. These divalent alcohols may be used alone or in combination of any tow or more kinds thereof.

Specific examples of the adipic acid ester-based compound include a poly(propylene glycol/adipic acid) ester, a poly(1,3-butanediol/adipic acid) ester, a poly(1,4-butanediol/adipic acid) ester, a poly(ethylene glycol/adipic acid) ester, a poly(1,6-hexanediol/butanediol/adipic acid) ester, a poly(butanediol/ethylene glycol/adipic acid) ester, a poly(ethylene glycol/propylene glycol/butanediol/adipic acid) ester, etc.

Of these compounds, in particular, from the standpoint of a good compatibility with the vinyl chloride-based resin (A) and a good low-elution property, preferred are a poly(1,3-butanediol/adipic acid) ester, a poly(1,4-butanediol/adipic acid) ester and a mixture thereof.

As the polyester polyol, there may be mentioned, for example, a polycondensate obtained by polycondensing an aliphatic dicarboxylic acid and/or an aromatic dicarboxylic acid with a divalent alcohol. Examples of the aliphatic dicarboxylic acid include succinic acid, adipic acid, sebacic acid, glutaric acid, azelaic acid, etc. Examples of the aromatic dicarboxylic acid include isophthalic acid, terephthalic acid, etc. Examples of the divalent alcohol include ethylene glycol, diethylene glycol, propylene glycol, 1,4-butanediol, 1,6-hexanediol, 3-methyl-1,5-pentanediol, neopentyl glycol, 1,4-dihydroxymethyl cyclohexane, etc.

Specific examples of the polyester polyol include polyethylene adipate diol, polybutylene adipate diol, polyhexamethylene adipate diol, polyneopentyl adipate diol, polyethylene/butylene adipate diol, poly-3-methyl pentane adipate diol, polybutylene isophthalate diol, etc. Of these polyester polyols, in particular, from the standpoint of a good compatibility with the vinyl chloride-based resin (A) and a good low-elution property, polyneopentyl adipate diol is preferably used.

The mixture of the modified epoxidized vegetable oil (B) and the aliphatic dibasic acid ester-based compound (C) is compounded in an amount of 30 to 50 parts by mass based on 100 parts by mass of the vinyl chloride-based resin (A), and the content of the modified epoxidized vegetable oil (B) in the mixture of the modified epoxidized vegetable oil (B) and the aliphatic dibasic acid ester-based compound (C) is 30 to 70% by mass. In addition, the polyester-based compound (D) is compounded in an amount of 5 to 15 parts by mass based on 100 parts by mass of the vinyl chloride-based resin (A). When the amount of the mixture of the modified epoxidized vegetable oil (B) and the aliphatic dibasic acid ester-based compound (C) compounded based on the vinyl chloride-based resin (A) lies within the above-specified range, it is possible to impart an optimum flexibility to the wrap film without occurrence of excessive bleeding-out of the modified epoxidized vegetable oil (B) and the aliphatic dibasic acid ester-based compound (C). In addition, when the content of the modified epoxidized vegetable oil (B) in the mixture of the modified epoxidized vegetable oil (B) and the aliphatic dibasic acid ester-based compound (C) lies within the above-specified range, it is possible to satisfy both of good flexibility and low-elution property of the resulting film without defective appearance of the film even when the film is stored under the low-temperature condition or under the high-temperature and high-humidity condition for a long period of time.

The amount of the mixture of the modified epoxidized vegetable oil (B) and the aliphatic dibasic acid ester-based compound (C) compounded based on 100 parts by mass of the vinyl chloride-based resin (A) is preferably not less than 33 parts by mass and not more than 47 parts by mass, and more preferably not less than 36 parts by mass and not more than 42 parts by mass. Also, the content of the modified epoxidized vegetable oil (B) in the mixture of the modified epoxidized vegetable oil (B) and the aliphatic dibasic acid ester-based compound (C) is preferably not less than 35% by mass and not more than 65% by mass, and more preferably not less than 40% by mass and not more than 60% by mass. Further, the amount of the polyester-based compound (D) compounded based on 100 parts by mass of the vinyl chloride-based resin (A) is preferably not less than 7 parts by mass and not more than 13 parts by mass, and more preferably not less than 9 parts by mass and not more than 11 parts by mass.

When compounding the modified epoxidized vegetable oil (B), the aliphatic dibasic acid ester-based compound (C) and the polyester-based compound (D) in the aforementioned ratios, it is possible to obtain a film for food packaging which is excellent in low-elution property (safety), packaging suitability (flexibility), unwinding property and appearance.

In order to enhance the thermal stability of the film for food packaging according to the present invention, it is preferred to compound a Ca—Zn-based stabilizer in the film. The Ca—Zn-based stabilizer is a mixture of a fatty acid calcium salt and a fatty acid zinc salt. Specific examples of the fatty acid include behenic acid, stearic acid, lauric acid, oleic acid, palmitic acid, ricinolic acid, benzoic acid, etc. The combination of two or more kinds of fatty acid salts may be used according to the requirements. From the standpoint of a good moldability, a stearic acid salt is preferably used. The mass ratio of zinc to calcium is preferably 1:2 to 1:3. When the mass ratio of zinc to calcium is less than 2, the resulting film tends to be tinted with a reddish color inherent to the calcium salt. When the mass ratio of zinc to calcium is more than 3, zinc chloride produced in the course of molding the composition tends to act as a decomposition catalyst for the vinyl-chloride-based resin, so that there tends to occur rapid blackening or decomposition called "zinc burn".

The amount of the Ca—Zn-based stabilizer added is preferably 0.1 to 2.0 parts by mass and more preferably not less than 0.3 part by mass or not more than 1.8 parts by mass based on 100 parts by mass of the vinyl chloride-based resin (A). When the amount of the Ca—Zn-based stabilizer added is less than 0.1 part by mass, the resulting film tends to be insufficient in effect of imparting a good thermal stability thereto. On the other hand, when the amount of the Ca—Zn-based stabilizer added is more than 2.0 parts by mass, there tends to occur rapid blackening or decomposition called "zinc burn".

Also, in order to impart a good anti-fogging property to the film for food packaging according to the present invention, an ester compound of a polyhydric alcohol and a fatty acid is preferably added thereto. Examples of the ester of the polyhydric alcohol and the fatty acid include a monoglycerol fatty acid ester, a polyglycerol fatty acid ester, a sorbitan fatty acid ester and a polyoxyethylene alkyl ether. The monoglycerol fatty acid ester is preferably a monoglycerol ester of a saturated or unsaturated fatty acid having 12 to 18 carbon atoms. Specific examples of the monoglycerol fatty acid ester include monoglycerol laurate, monoglycerol myristate, monoglycerol palmitate, monoglycerol stearate, monoglycerol oleate, monoglycerol linoleate, etc. The polyglycerol fatty acid ester is preferably a polyglycerol ester of a saturated or unsaturated fatty acid having 12 to 18 carbon atoms. Specific examples of the polyglycerol fatty acid ester include polyglycerol laurate, polyglycerol myristate, polyglycerol palmitate, polyglycerol stearate, polyglycerol oleate, polyglycerol linoleate, etc.

The sorbitan fatty acid ester is preferably a sorbitan ester of a saturated or unsaturated fatty acid having 12 to 18 carbon atoms. Specific examples of the sorbitan fatty acid ester include sorbitan laurate, sorbitan myristate, sorbitan palmitate, sorbitan stearate, sorbitan oleate, sorbitan linoleate, etc. The polyoxyethylene alkyl ether is preferably a polyoxyethylene alkyl ether of a saturated alcohol having 12 to 18 carbon atoms, and more preferably such a polyoxyethylene alkyl ether that the number of moles of ethyleneoxide added thereto is 3 to 7. Specific examples of the polyoxyethylene alkyl ether include polyoxyethylene lauryl ether, polyoxyethylene myristyl ether, polyoxyethylene palmityl ether, polyoxyethylene stearyl ether, etc. These polyoxyethylene alky ethers may be used alone or in combination of any two or more thereof.

The amount of the ester compound of the polyhydric alcohol and the fatty acid added is preferably 0.1 to 5.0 parts by mass, more preferably not less than 0.5 part by mass or not more than 4.5 parts by mass, and even more preferably not less than 1.0 part by mass or not more than 3.5 parts by mass based on 100 parts by mass of the vinyl chloride-based resin (A). When the amount of the ester compound added is not less than 0.5 part by mass, the resulting film can exhibit a sufficient anti-fogging property. For example, in the case where a container filled with food, etc., is packaged with a film and stored, occurrence of such a defect that water droplets are attached on the film so that it is impossible to visually recognize contents of the container, can be avoided. On the other hand, when the amount of the ester compound added is not more than 5.0 parts by mass, bleeding-out of an excessive amount of the ester compound of the polyhydric alcohol and the fatty acid on the surface of the molded product can be suppressed, so that the resulting film can exhibit a satisfactory packaging suitability.

Further, various additives such as a heat stabilizer, an antioxidant, an ultraviolet absorber, a light stabilizer, an antimicrobial or mildew-proof agent, an antistatic agent, a lubricant, a pigment and a dye may be compounded in the resin composition according to the present invention unless the effects of the present invention are adversely affected.

The film for food packaging according to the present invention may be produced by conventionally known methods. For example, after mixing and kneading the vinyl chloride-based resin (A), the modified epoxidized vegetable oil (B), the aliphatic dibasic acid ester-based compound (C), the polyester-based compound (D) and the other additives by a method in which these components are mixed using a mixer such as a V-type blender, a ribbon blender and a Henschel mixer, a method in which these components are kneaded using a kneading device such as an extruder, a mixing roll, a Banbury mixer and a kneader, or a method in which these components are mixed and kneaded using the combination of these mixers and kneading devices, the resulting composition may be molded, for example, by a T-die method or an inflation method to produce a film.

The thus obtained film is capable of satisfying all of a low-elution property (safety), a packaging suitability (flexibility) and an appearance, and therefore can be extensively used as a film for food packaging.

The term "film" generally means a thin flat product having a considerably small thickness as compared to a length and a width thereof whose maximum thickness is optionally limited, and the film is usually provided in the form of a roll (Japanese Industrial Standards JIS K 6900), whereas the term "sheet" generally means a flat product that is thin and generally has a small thickness as compared to a length and a width thereof according to the definition by JIS. However, the boundary between the sheet and the film is unclear, and in the present invention, it is not necessary to literally distinguish the sheet and the film from each other. Therefore, in the present invention, it should be construed that the product referred to as the "film" includes the "sheet", and the product referred to as the "sheet" includes the "film".

EXAMPLES

The present invention is described in more detail by Examples below. However, the following Examples are only illustrative and not intended to limit the present invention thereto. Meanwhile, various measurements and evaluations of raw materials and test pieces as described in the present specification were conducted as follows.

(1) Content of Multimers of Epoxidized Vegetable Oil in Modified Epoxidized Vegetable Oil:

That is, the measurement was conducted by gel permeation chromatography (column: "TSKgel G2000HXL" (tradename) manufactured by Tosoh Corporation) using THF (solution concentration: 2.5 mg/mL; amount of solution injected: 0.05 mL; flow rate: 1 mL/min; temperature: 40° C.) as a solvent. From the obtained chart, the content of the monomers of the epoxidized vegetable oil in the modified epoxidized vegetable oil was calculated, and the content of multimers of the epoxidized vegetable oil in the modified epoxidized vegetable oil was determined from the thus calculated monomer content according to the following formula.

Multimer Content (% by mass)=100 (% by mass)–[monomer content (% by mass)]

(2) Elution Property:

On the basis of the evaporation residue testing method (one-side method) as prescribed in The Ministry of Health & Welfare Notice No. 20 using isooctane as a solvent, the film was subjected to the measurement of an elution amount against isooctane under the following conditions: contact area with solvent: 25 $cm^2$; amount of solvent used: 2 $mL/cm^2$; test temperature: 25° C.; test time: 30 min. The elution amounts thus measured are shown in Table 1. The film having an elution amount to 120 ppm or less is evaluated as being "acceptable".

(3) Flexibility (Storage Elastic Modulus (E')):

Using a dynamic viscoelasticity analyzer "Viscoelastic Spectrometer DVA-200" (tradename) manufactured by I.T. Keisoku Seigyo Co., Ltd., the storage elastic modulus (E') of a film was measured at an oscillation frequency of 10 Hz and a distortion of 0.1% while the temperature was raised at a rate of 3° C./min from –100° C. to 200° C. to read out the value of the storage elastic modulus (E') at 25° C. from the thus obtained data. The values thus read out are shown in Table 1. The film having a storage elastic modulus (E') at 25° C. of 100 to 500 MPa was evaluated as being "acceptable".

(4) Film Winding-off Property (Winding-off Force of Film):

After winding 10 m of a 50 mm-wide film produced in the respective Examples and Comparative Examples around a cylindrical paper tube having an outer diameter of 85 mm and a length of 330 mm, a vinyl chloride resin pipe having an outer diameter of 25 mm was inserted into the paper tube so as to allow smooth rotation of the resulting film roll therearound. Next, while grasping a tip end of the film by a clip to uniformly wind off the film from the roll, the film was wound off at a rate of 3 cm/s to measure a load applied thereto using a force gauge. When the winding-off force of the film fell within the range of 0.1 to 0.5 N/50 mm, the film was evaluated as being "acceptable".

The winding-off force of the film is influenced by the amount and molecular weight of the plasticizer added or the kind and amount of the anti-fogging agent added, and in particular has a correlation with the amount of the low-molecular weight plasticizer compounded. As the amount of the low-molecular weight plasticizer compounded increases, the bleeding on the surface of the film tends to occur more frequently, and the winding-off force tends to be reduced.

(5) Change in Appearance of Film:

The film produced in the respective Examples and Comparative Examples was cut into a size of 50 mm in length×50 mm in width to prepare a sample for evaluation. The thus prepared sample was allowed to stand under the low-temperature and low-humidity condition of 0° C. and 15% RH or under the high-temperature and high-humidity condition of 40° C. and 80% RH for 7 days. After completion of the standing test, the surface of the sample was observed. The film suffering from no change (no whitening) under both of the above conditions was evaluated as the rating "A", whereas the film suffering from whitening under any of the above conditions was evaluated as the rating "B". The results are shown in Table 1.

Materials used in the following Examples and Comparative Examples were prepared as follows.

[Vinyl chloride-based resin (A)]
(A)-1: Polyvinyl chloride (homopolymer of vinyl chloride; average polymerization degree: 1050)

[Modified epoxidized vegetable oil (B)]
(B)-1: Epoxidized soybean oil having a peroxide value of 13.3
(B)-2: Epoxidized soybean oil having a peroxide value of 15.1
(B)-3: Epoxidized soybean oil having a peroxide value of 10.1

[Aliphatic dibasic acid ester-based compound (C)]
(C)-1: "SANSOCIZER DINA" (tradename) (diisononyl adipate; weight-average molecular weight: 398) produced by New Japan Chemical Co., Ltd.
(C)-2: "TOTM" (tradename) (tris(2-ethylhexyl) trimellitate; weight-average molecular weight: 547) produced by J-Plus Co., Ltd.

[Polyester-based compound (D)]
(D)-1: Poly(1,3-butanediol/adipic acid) ester (weight-average molecular weight: 6,000)
(D)-2: "POLYLITE OD-X-2044" (tradename) (polyneopentyl adipate diol; weight-average molecular weight: 6,800) produced by DIC Corporation
(D)-3: "HS2P-103S" (tradename) (polypropylene sebacate diol; weight-average molecular weight: 4,900) produced by HOKOKU Cp., Ltd.
(D)-4: "D620" (tradename) (dioctyl adipate/diisononyl adipate; weight-average molecular weight: 2,800) produced by J-Plus Co., Ltd.
(D)-5: "SANESTER 24625Y" (tradename) (poly(ethylene/butylene) adipate diol; weight-average molecular weight: 11,300) produced by Sanyo Chemical Industries, Ltd.

[Other components (J)]
(J)-1: "ADEKASTAB SP-76" (tradename) (Ca—Zn-based stabilizer) ADEKA Corporation
(J)-2: Succinic acid

Example 1

A super mixer was charged with 100 parts by mass of (A)-1, 15 parts by mass of (B)-1, 25 parts by mass of (C)-1, 10 parts by mass of (D)-1 and 1 part by mass of (J)-1, and then the contents of the super mixer were heated and mixed by raising the temperature of these materials from ordinary temperature to 130° C. while stirring. Thereafter, the resulting mixture was cooled to 70° C. at which the mixture was taken out of the super mixer, thereby obtaining a resin composition.

The thus obtained resin composition was extrusion-molded at a resin temperature of 200° C. using a 40 mmφ single-screw extruder (L/D=20) equipped with a T die (width: 350 mm; gap: 0.4 mm), thereby obtaining a film having a thickness of 0.01 mm. The thus obtained film was evaluated for the content of multimers of the epoxidized vegetable oil in the modified epoxidized vegetable oil, elution property, flexibility, winding-off property and change in appearance. The results are shown in Table 1.

Example 2

The same procedure as in Example 1 was conducted except that (B)-1 and (C)-1 were used in amounts of 20 parts by mass and 20 parts by mass, respectively, thereby producing a film. The thus obtained film was subjected to the same evaluation as in Example 1. The results are shown in Table 1.

Example 3

The same procedure as in Example 1 was conducted except that (B)-1 and (C)-1 were used in amounts of 25 parts by mass and 15 parts by mass, respectively, thereby producing a film. The thus obtained film was subjected to the same evaluation as in Example 1. The results are shown in Table 1.

Example 4

The same procedure as in Example 1 was conducted except that (B)-1 and (C)-1 were used in amounts of 20 parts by mass and 15 parts by mass, respectively, thereby producing a film. The thus obtained film was subjected to the same evaluation as in Example 1. The results are shown in Table 1.

Example 5

The same procedure as in Example 1 was conducted except that (B)-1 and (C)-1 were used in amounts of 25 parts by mass and 20 parts by mass, respectively, thereby producing a film. The thus obtained film was subjected to the same evaluation as in Example 1. The results are shown in Table 1.

Example 6

The same procedure as in Example 1 was conducted except that in Example 2, (B)-2 was used in place of (B)-1, thereby producing a film. The thus obtained film was subjected to the same evaluation as in Example 1. The results are shown in Table 1.

Example 7

The same procedure as in Example 1 was conducted except that in Example 2, (D)-2 was used in place of (D)-1, thereby producing a film. The thus obtained film was subjected to the same evaluation as in Example 1. The results are shown in Table 1.

Example 8

The same procedure as in Example 1 was conducted except that in Example 2, (C)-2 was used in place of (C)-1, thereby producing a film. The thus obtained film was subjected to the same evaluation as in Example 1. The results are shown in Table 1.

Example 9

The same procedure as in Example 1 was conducted except that in Example 2, (D)-3 was used in place of (D)-1, thereby producing a film. The thus obtained film was subjected to the same evaluation as in Example 1. The results are shown in Table 1.

Example 10

The same procedure as in Example 2 was conducted except that (B)-3 was used in place of (B)-1 to change the content of multimers of the epoxidized vegetable oil in the modified epoxidized vegetable oil (B) to 7.8% by mass, thereby producing a film. The thus obtained film was subjected to the same evaluation as in Example 1. The results are shown in Table 1.

Comparative Example 1

The same procedure as in Example 1 was conducted except that (B)-1 and (C)-1 were used in amounts of 30 parts by mass and 10 parts by mass, respectively, thereby producing a film. The thus obtained film was subjected to the same evaluation as in Example 1. The results are shown in Table 1.

Comparative Example 2

The same procedure as in Example 1 was conducted except that (B)-1 and (C)-1 were used in amounts of 10 parts by mass and 30 parts by mass, respectively, thereby producing a film. The thus obtained film was subjected to the same evaluation as in Example 1. The results are shown in Table 1.

Comparative Example 3

The same procedure as in Example 1 was conducted except that (B)-1 and (C)-1 were used in amounts of 10 parts by mass and 15 parts by mass, respectively, thereby producing a film. The thus obtained film was subjected to the same evaluation as in Example 1. The results are shown in Table 1.

Comparative Example 4

The same procedure as in Example 1 was conducted except that (B)-1, (C)-1 and (D)-1 were used in amounts of 15 parts by mass, 15 parts by mass and 20 parts by mass, respectively, thereby producing a film. The thus obtained film was subjected to the same evaluation as in Example 1. The results are shown in Table 1.

Comparative Example 5

A super mixer was charged with 100 parts by mass of (A)-1, 40 parts by mass of (B)-1, 10 parts by mass of (C)-1 and 1 part by mass of (J)-1, but with no polyester-based compound (D), and then the contents of the super mixer were heated and mixed by raising the temperature of these materials to 130° C. while stirring. Thereafter, the resulting mixture was cooled to 60° C. at which the mixture was taken out of the super mixer, thereby obtaining a resin composition.

The thus obtained resin composition was molded into a film by the same method as in Example 1, and the thus obtained film was subjected to the same evaluation as in Example 1. The results are shown in Table 1.

Comparative Example 6

The same procedure as in Example 1 was conducted except that in Example 2, 1.2 parts by mass of succinic acid (J)-2 as a dicarboxylic acid was further added, thereby producing a film. The multimer content of the modified epoxidized vegetable oil compounded in the thus obtained film was excessively large (58% by mass), and the dispersing condition of the modified epoxidized vegetable oil was therefore poor, thereby failing to obtain a film having a good appearance. As a result, it was not possible to subject the film to the same evaluation as in Example 1.

Comparative Example 7

The same procedure as in Example 1 was conducted except that in Example 2, (D)-4 was used in place of (D)-1, thereby producing a film. The thus obtained film was subjected to the same evaluation as in Example 1. The results are shown in Table 1.

Comparative Example 8

The same procedure as in Example 1 was conducted except that in Example 2, (D)-5 was used in place of (D)-1, thereby producing a film. However, the polyester compound was bled out on the surface of the film, thereby failing to obtain a film having a good appearance. As a result, it was not possible to subject the film to the same evaluation as in Example 1.

TABLE 1

| | Examples | | | | |
|---|---|---|---|---|---|
| | 1 | 2 | 3 | 4 | 5 |
| (A)-1 | 100 | 100 | 100 | 100 | 100 |
| (B)-1 | 15 | 20 | 25 | 15 | 25 |
| (B)-2 | | | | | |
| (B)-3 | | | | | |
| (C)-1 | 25 | 20 | 15 | 20 | 20 |
| (C)-2 | | | | | |
| (D)-1 | 10 | 10 | 10 | 15 | 10 |
| (D)-2 | | | | | |
| (D)-3 | | | | | |
| (D)-4 | | | | | |
| (D)-5 | | | | | |
| (J)-1 | 1 | 1 | 1 | 1 | 1 |
| (J)-2 | | | | | |
| Total amount (part(s) by mass) of (B) and (C) added based on 100 parts by mass of (A) | 40.0 | 40.0 | 40.0 | 35.0 | 45.0 |
| Content (% by mass) of (B) in sum of (B) and (C) | 37.5 | 50.0 | 62.5 | 42.9 | 55.6 |
| Amount (part(s) by mass) of (D) added based on 100 parts by mass of (A) | 10.0 | 10.0 | 10.0 | 15.0 | 10.0 |
| Multimer content (% by mass) in epoxidized vegetable oil | 10.1 | 10.1 | 10.1 | 10.1 | 10.1 |
| Elution amount (ppm) | 114 | 94 | 88 | 90 | 108 |
| Storage elastic modulus (E') | 120 | 180 | 250 | 230 | 220 |
| Winding-off force of film (N/50 mm) | 0.32 | 0.37 | 0.40 | 0.42 | 0.35 |
| Change in appearance of film | A | A | A | A | A |

| | Examples | | | | |
|---|---|---|---|---|---|
| | 6 | 7 | 8 | 9 | 10 |
| (A)-1 | 100 | 100 | 100 | 100 | 100 |
| (B)-1 | | 20 | 20 | 20 | |
| (B)-2 | 20 | | | | |
| (B)-3 | | | | | 20 |
| (C)-1 | 20 | 20 | | 20 | 20 |
| (C)-2 | | | 20 | | |
| (D)-1 | 10 | | 10 | | 10 |
| (D)-2 | | 10 | | | |
| (D)-3 | | | | 10 | |
| (D)-4 | | | | | |

TABLE 1-continued

|  | | | | | |
|---|---|---|---|---|---|
| (D)-5 | | | | | |
| (J)-1 | 1 | 1 | 1 | 1 | 1 |
| (J)-2 | | | | | |
| Total amount (part(s) by mass) of (B) and (C) added based on 100 parts by mass of (A) | 40.0 | 40.0 | 40.0 | 40.0 | 20.0 |
| Content (% by mass) of (B) in sum of (B) and (C) | 50.0 | 50.0 | 50.0 | 50.0 | 50.0 |
| Amount (part(s) by mass) of (D) added based on 100 parts by mass of (A) | 10.0 | 10.0 | 10.0 | 10.0 | 10.0 |
| Multimer content (% by mass) in epoxidized vegetable oil | 11.8 | 10.1 | 10.1 | 10.1 | 7.8 |
| Elution amount (ppm) | 90 | 89 | 78 | 108 | 128 |
| Storage elastic modulus (E') | 200 | 170 | 320 | 160 | 170 |
| Winding-off force of film (N/50 mm) | 0.35 | 0.39 | 0.44 | 0.36 | 0.35 |
| Change in appearance of film | A | A | A | A | A |

|  | Comparative Examples | | | | |
|---|---|---|---|---|---|
|  | 1 | 2 | 3 | 4 | 5 |
| (A)-1 | 100 | 100 | 100 | 100 | 100 |
| (B)-1 | 30 | 10 | 10 | 15 | 40 |
| (B)-2 | | | | | |
| (B)-3 | | | | | |
| (C)-1 | 10 | 30 | 15 | 15 | 10 |
| (C)-2 | | | | | |
| (D)-1 | 10 | 10 | 10 | 20 | |
| (D)-2 | | | | | |
| (D)-3 | | | | | |
| (D)-4 | | | | | |
| (D)-5 | | | | | |
| (J)-1 | 1 | 1 | 1 | 1 | 1 |
| (J)-2 | | | | | |
| Total amount (part(s) by mass) of (B) and (C) added based on 100 parts by mass of (A) | 40.0 | 40.0 | 25.0 | 30.0 | 50.0 |
| Content (% by mass) of (B) in sum of (B) and (C) | 75.0 | 25.0 | 40.0 | 50.0 | 80.0 |
| Amount (part(s) by mass) of (D) added based on 100 parts by mass of (A) | 10.0 | 10.0 | 10.0 | 20.0 | — |
| Multimer content (% by mass) in epoxidized vegetable oil | 10.1 | 10.1 | 10.1 | 10.1 | 10.1 |
| Elution amount (ppm) | 78 | 138 | 54 | 62 | 140 |
| Storage elastic modulus (E') | 210 | 80 | 620 | 380 | 150 |
| Winding-off force of film (N/50 mm) | 0.42 | 0.28 | 0.47 | 0.58 | 0.27 |
| Change in appearance of film | B | A | A | A | B |

|  | Comparative Examples | | |
|---|---|---|---|
|  | 6 | 7 | 8 |
| (A)-1 | 100 | 100 | 100 |
| (B)-1 | 20 | 20 | 20 |
| (B)-2 | | | |
| (B)-3 | | | |
| (C)-1 | 20 | 20 | 20 |
| (C)-2 | | | |
| (D)-1 | | 10 | |
| (D)-2 | | | |
| (D)-3 | | | |
| (D)-4 | 10 | | |
| (D)-5 | | | 10 |
| (J)-1 | 1 | 1 | 1 |
| (J)-2 | added | | |
| Total amount (part(s) by mass) of (B) and (C) added based on 100 parts by mass of (A) | 40.0 | 40.0 | 40.0 |
| Content (% by mass) of (B) in sum of (B) and (C) | 50.0 | 50.0 | 50.0 |
| Amount (part(s) by mass) of (D) added based on 100 parts by mass of (A) | 10.0 | 10.0 | 10.0 |
| Multimer content (% by mass) in epoxidized vegetable oil | 58 | 10.1 | * |
| Elution amount (ppm) | * | 146 | * |
| Storage elastic modulus (E') | * | 140 | * |
| Winding-off force of film (N/50 mm) | * | 0.33 | * |
| Change in appearance of film | * | A | * |

Note
*: Not evaluated owing to poor appearance of film

INDUSTRIAL APPLICABILITY

The film according to the present invention can be suitably used, for example, as a film for food packaging.

The invention claimed is:

1. A film for food packaging, comprising a vinyl chloride-based resin (A),
    a modified epoxidized vegetable oil (B) having a multimer content of 5 to 50% by mass, an aliphatic dibasic acid ester-based compound (C) with not more than 10 carbon atoms having a weight-average molecular weight of 200 to 1000, and
    a polyester-based compound (D) having a weight-average molecular weight of 4000 to 9000, wherein
    a mixture of the modified epoxidized vegetable oil (B) and the aliphatic dibasic acid ester-based compound (C) are compounded in an amount of 30 to 50 parts by mass based on 100 parts by mass of the vinyl chloride-based resin (A),
    a content of the modified epoxidized vegetable oil (B) in the mixture of the modified epoxidized vegetable oil (B) and the aliphatic dibasic acid ester-based compound (C) is 30 to 70% by mass, and
    the polyester-based compound (D) is compounded in an amount of 5 to 15 parts by mass based on 100 parts by mass of the vinyl chloride-based resin (A),
    the modified epoxidized vegetable oil (B) has a peroxide value of 13.1 to 18.0 milli equivalent (mEq)/kg.

2. The film for food packaging according to claim 1, wherein the aliphatic dibasic acid ester (C) with not more than 10 carbon atoms is diisononyl adipate.

3. The film for food packaging according to claim 1, wherein the polyester-based compound (D) is an adipic acid ester compound, a polyester polyol, or a mixture of the adipic acid ester compound and the polyester polyol.

4. The film for food packaging according to claim 3, wherein the adipic acid ester compound is a poly(1,3-butanediol/adipic acid) ester, a poly(1,4-butanediol/adipic acid) ester or a mixture thereof.

* * * * *